(12) United States Patent
Zhao et al.

(10) Patent No.: US 7,080,407 B1
(45) Date of Patent: Jul. 18, 2006

(54) VIRUS DETECTION AND REMOVAL SYSTEM AND METHOD FOR NETWORK-BASED SYSTEMS

(75) Inventors: Guangyu Zhao, Sunnyvale, CA (US); Meyer Liu, San Francisco, CA (US); Subramaniam Badrinath, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 998 days.

(21) Appl. No.: 09/607,430

(22) Filed: Jun. 27, 2000

(51) Int. Cl.
*H04L 9/00* (2006.01)
(52) U.S. Cl. .................... 726/24; 726/22; 713/188
(58) Field of Classification Search ............. 713/188, 713/200, 201; 709/230, 238–240; 726/24
See application file for complete search history.

(56) References Cited

U.S. PATENT DOCUMENTS

| | | | | |
|---|---|---|---|---|
| 5,473,769 A | * | 12/1995 | Cozza | 714/39 |
| 5,485,575 A | * | 1/1996 | Chess et al. | 714/38 |
| 5,559,960 A | * | 9/1996 | Lettvin | 713/200 |
| 5,613,002 A | * | 3/1997 | Kephart et al. | 713/200 |
| 5,696,822 A | * | 12/1997 | Nachenberg | 713/200 |
| 5,832,208 A | * | 11/1998 | Chen et al. | 713/201 |
| 5,948,104 A | * | 9/1999 | Gluck et al. | 713/200 |
| 5,956,481 A | * | 9/1999 | Walsh et al. | 713/200 |
| 5,978,917 A | * | 11/1999 | Chi | 713/201 |
| 6,088,803 A | * | 7/2000 | Tso et al. | 713/201 |
| 6,269,456 B1 | * | 7/2001 | Hodges et al. | 714/38 |
| 6,760,760 B1 | * | 7/2004 | McGrane | 709/219 |

* cited by examiner

*Primary Examiner*—Kambiz Zand
(74) *Attorney, Agent, or Firm*—Sierra Patent Group, Ltd.

(57) ABSTRACT

An enhanced virus detection monitoring (VDM) system and method suitable for use with network systems, and in particular electronic document control systems (EDCS) is disclosed. The VDM system intercepts files and documents before they are made available to other users ("check-in") and inspects the files/documents for virus infection. If a virus infection is found in a file or document, the VDM system invokes anti-virus software to disinfect the file or document. Once the virus has been removed from the file or document, the file (or document) is then made available to other users of the system. If the virus cannot be removed, the file (or document) is not allowed to be checked-in.

19 Claims, 4 Drawing Sheets

VIRUS DETECTION AND REMOVAL SYSTEM AND METHOD FOR NETWORK-BASED SYSTEMS

BACKGROUND OF THE INVENTION

1. Field of the Invention

This invention pertains generally to computer virus prevention systems. More particularly, the invention is an enhanced system and method for virus detection and removal for network-based systems which provides for virus inspection upon document check-in.

2. The Prior Art

With the growth of computer networks, such as local area networks (LANs), wide area networks (WANs), and the global information network known as the Internet, the need for securing data on such networks has also grown. Among other things, securing the networks and computers participating in the networks against computer viruses has been a priority for network administrators and computer users.

Virus detection and removal software systems ("anti-virus" software) for protecting computer systems and computer networks are known in the art. Such anti-virus software is generally available as commercial products from such software developers as Norton™, McAfee™, IBM®, and Symantec™, among others. Other anti-virus software is also available in the form of shareware or freeware.

Existing anti-virus software comprises two general types: stand-alone versions and network (or server) versions. Stand-alone versions are configured to operate on and protect data on a single node on the network, while network versions are configured to operate on and protect data on one or more network servers, as well as other network nodes.

In operation, both versions of anti-virus software periodically check files on a computer or network of computers to detect and remove viruses. While varying from one implementation to another, the anti-virus software according to the prior art generally operates (i.e., carries out detection and removal) during one or more of the following events: boot up of a computer, shut down of a computer, and introduction of new media (e.g., floppy diskette or CD-ROM). The anti-virus software may also be configured to operate at scheduled intervals (e.g., every day at 2:00 A.M.).

With the threat of virus infection via email documents, some anti-virus software applications provide detection and removal of viruses contained with email messages and email attachments. While effective for most computer and network applications, prior art anti-virus solutions have certain disadvantages, which are overcome by the present invention.

In the domain of shared-document systems (such as electronic document control systems), the threat of virus infection is also realized, particularly, where the document system includes a plurality of users submitting and updating documents and/or files at a rapid rate. For example, where a document infected with a virus is posted to a share-document system, other users of the system who download the infected file are at risk of infecting the user's local machine. A system running anti-virus software which is schedule to operate during start-up or shut-down would not be able to detect the infected file, because the file upload occurs during operation of the system and not during the start-up or shut-down.

In the case where the anti-virus application is scheduled to operate at predetermined intervals, there is a risk that the infected file may not be checked prior to download by another user, particularly, if the scheduled interval for virus checking is large in comparison to the interval between upload and download transfers by users of the system. Since the files uploaded by users of the systems are communicated over the network, rather than via "new media" (e.g., floppy diskette or CD-ROM), files associated with user uploads are not inspected for viruses.

In light of these deficiencies in prior art anti-virus implementations, and since viruses are now capable of residing in data documents (e.g., Microsoft® Word documents via macros) as well as executable files, virus infections poses even more risk to data integrity for network systems and users of such systems.

Accordingly, there is a need for a method and apparatus which provides for anti-virus protection upon document check-in for network systems, and in particular, shared-document systems. The present invention satisfies these needs, as well as others, and generally overcomes the deficiencies found in the background art.

BRIEF DESCRIPTION OF THE INVENTION

The present invention is an enhanced virus detection monitoring (VDM) system and method suitable for use with network systems, and in particular electronic document control systems (EDCS). The VDM system intercepts files and documents before they are made available to other users ("check-in") and inspects the files/documents for virus infection. If a virus infection is found in a file or document, the VDM system invokes anti-virus software to disinfect the file or document. Once the virus has been removed from the file or document, the file (or document) is then made available to other users of the system. If the virus cannot be removed, the file (or document) is not allowed to be checked-in.

The invention further relates to machine readable media on which are stored embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

An object of the invention is to provide a virus detection monitoring system which overcomes the deficiencies associated with the prior art.

Another object of the invention is to provide a virus detection monitoring system which intercepts and checks files/documents for viruses before such files/documents are made available to other users.

Yet another object of the invention is to provide a virus detection monitoring system which periodically updates and verifies virus data associated with anti-virus software.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 1:
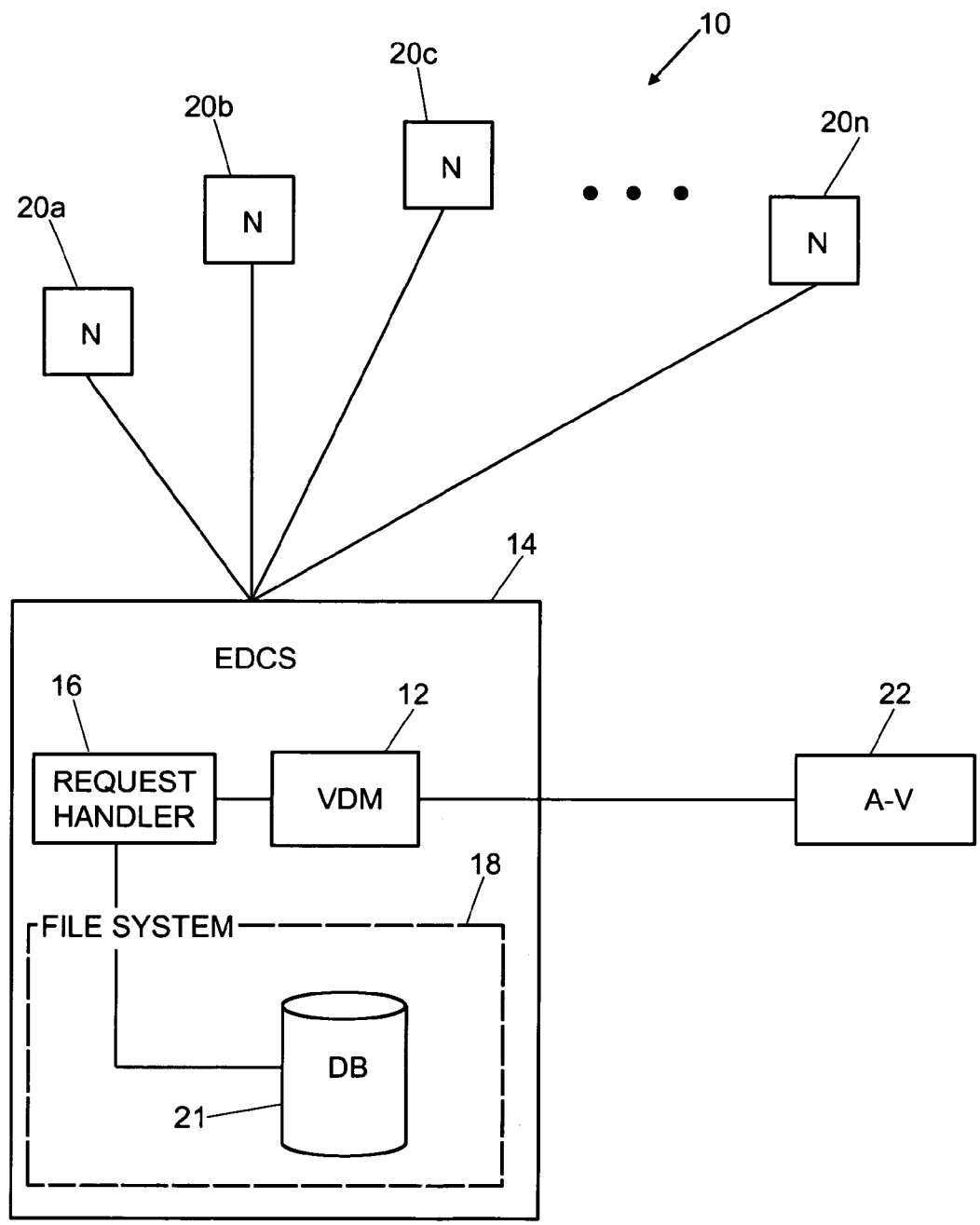
FIG. 1 is a functional block diagram depicting a system suitable for use with the virus detection monitoring system in accordance with the present invention.
Figure 2:
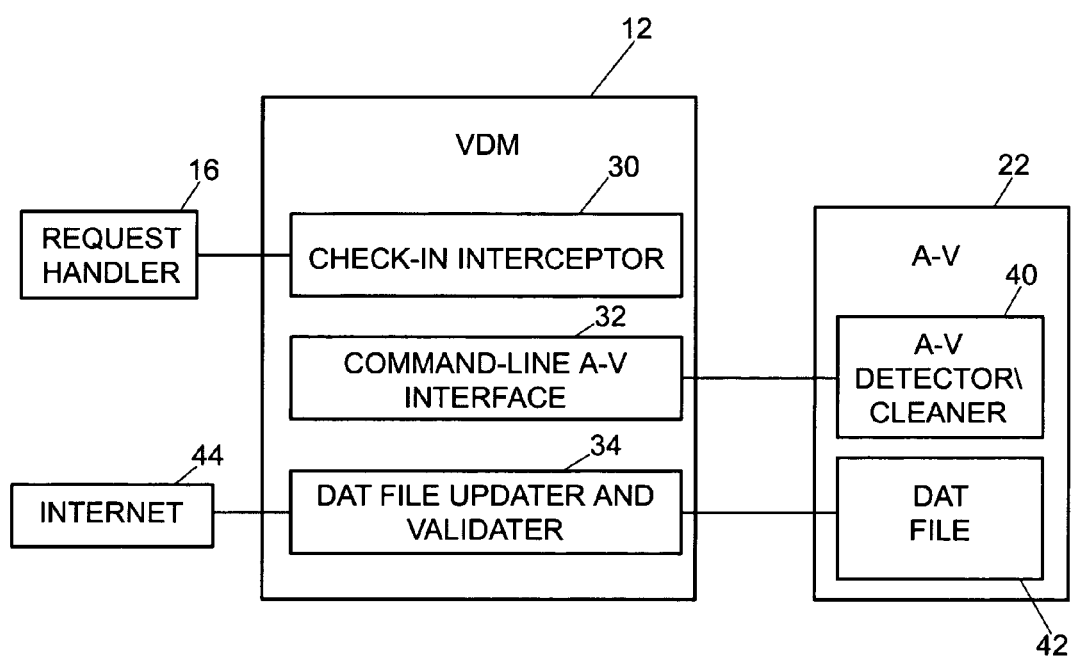
FIG. 2 is a functional block diagram depicting a virus detection monitoring system in accordance with the present invention.
Figure 3:
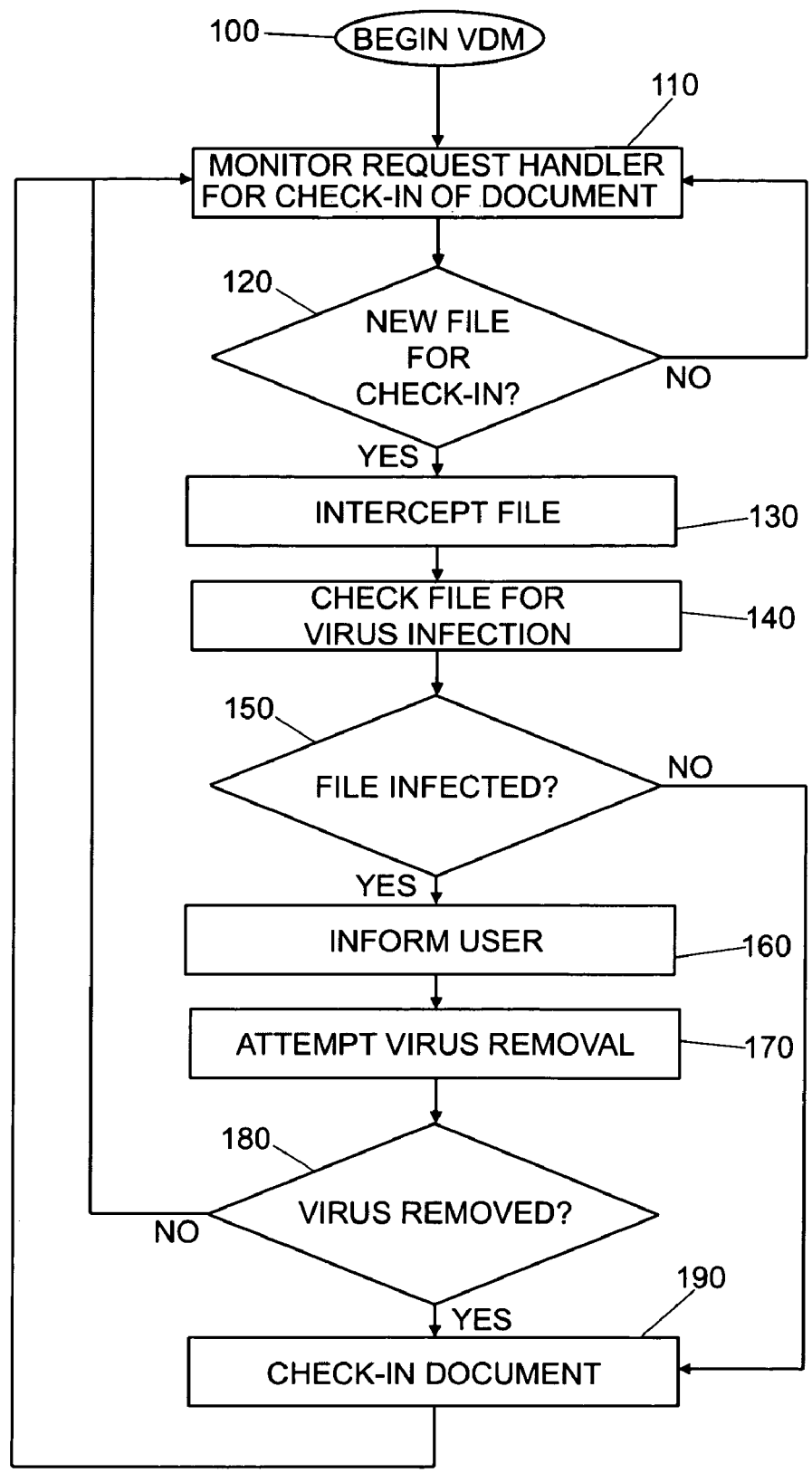
FIG. 3 is a logical flow diagram depicting the acts associated with monitoring a document control system in accordance with the present invention.
Figure 4:
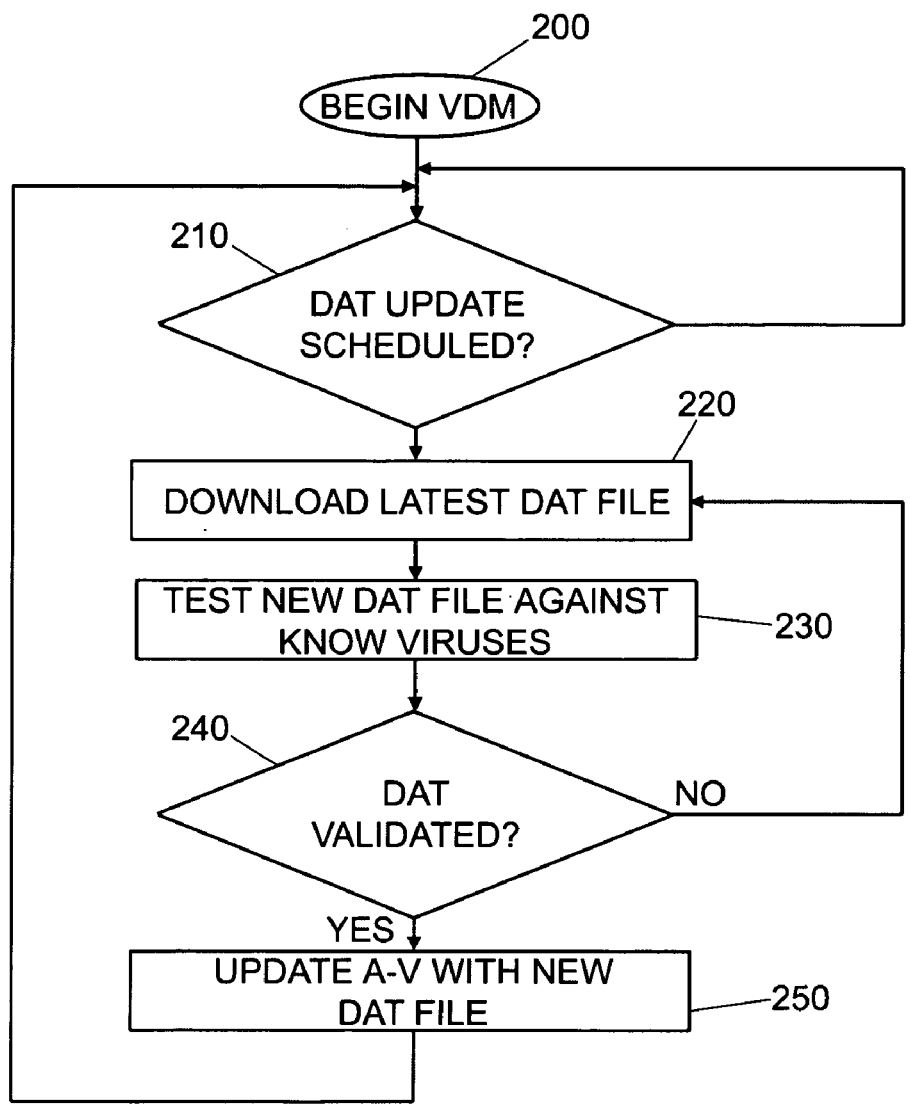
FIG. 4 is a logical flow diagram depicting the acts associated with updating the virus data file in accordance with the present invention.

Referring more specifically to the drawings, for illustrative purposes the present invention is embodied in the apparatus shown FIG. 1 and FIG. 2 and the method outlined in FIG. 3 and FIG. 4. It will be appreciated that the apparatus may vary as to configuration and as to details of the parts, and that the method may vary as to details and the order of the steps, without departing from the basic concepts as disclosed herein. The invention is disclosed generally in terms of virus detection monitoring system for an electronic document control system, although numerous other uses for the invention will suggest themselves to persons of ordinary skill in the art.

Referring first to FIG. 1, there is shown a functional block diagram of a network system 10 suitable for use with the virus detection monitoring system (VDM) 12 of the present invention. The VDM 12 operates within a network server 14 which can be any standard data processing means or computer, including a minicomputer, a microcomputer, a UNIX® machine, a mainframe machine, a personal computer (PC) such as INTEL® based processing computer or clone thereof, an APPLE® computer or clone thereof or, a SUN® workstation, or other appropriate computer. As shown in FIG. 1 for illustrative purposes only, the network server 14 comprises an electronic document control system (EDCS), which is a web-based document sharing systems allowing users of the EDCS to upload, update and download documents from the EDCS. It will be apparent to those skilled in the art having the benefit of this disclosure that the VDM 12 is also suitable for use with other network systems for sharing documents and files including, for example, FTP (file transfer protocol) servers, news server, mail servers, remote access servers, and virtual private network systems.

ECDS server 14 generally includes conventional computer components (not shown), such as a motherboard, a central processing unit (CPU), random access memory (RAM), display adapter, other storage media such as diskette drive, CD-ROM, flash-ROM, tape drive, PCMCIA cards and/or other removable media, a monitor, keyboard, mouse and/or other user interface means, a modem, network interface card (NIC), and/or other conventional input/output devices. EDCS server 14 has loaded in its RAM a conventional server operating system (not shown) such as UNIX®, WINDOWS® NT, NOVELL®, SOLARIS®, LINUX or other server operating system. EDCS 14 also has loaded in its RAM web server software (not shown) such as NETSCAPE®, INTERNET INFORMATION SERVER™ (IIS), or other appropriate web server software loaded for handling HTTP (hypertext transfer protocol) or Web page requests. In accordance with the invention, server 14 further comprises a request handler 16 which is part of the Web server software and a file system 18, which are discussed in more detail below.

System 10 also comprises at least one client node (N) 20a, although typically system 10 will comprise a plurality of nodes (20a through 20n), each operatively coupled for communication with the ECDS server 14, as shown in FIG. 1. Each client node 20a through 20n, like EDCS server 14, preferably comprises a standard computer such as a minicomputer, a microcomputer, a UNIX® machine, mainframe machine, personal computer (PC) such as INTEL®, APPLE®, or SUN® based processing computer or clone thereof, or other appropriate computer. Each client node 20a through 20n also includes typical computer components (not shown), such as a motherboard, central processing unit (CPU), random access memory (RAM), hard disk drive, display adapter, other storage media such as diskette drive, CD-ROM, flash-ROM, tape drive, PCMCIA cards and/or other removable media, a monitor, keyboard, mouse and/or other user interface means, a modem, network interface card (NIC), and/or other conventional input/output devices. Each client node 20a through 20n also has loaded in it RAM an operating system (not shown) such as UNIX®, WINDOWS® 98 or the like. Each client node 20a through 20n further has loaded in RAM a Web Browser program (not shown) such as NETSCAPE®, INTERNET EXPLORER®, AOL®, or like browsing software for client computers.

Each client node 20a through 20n is normally embodied in conventional a desktop or "tower" machine, but can alternatively be embodied in a portable or "laptop" computer, a handheld personal digital assistant (PDA), a cellular phone capable of browsing Web pages, a dumb terminal capable of browsing Web pages, an internet terminal capable of browsing Web pages such as WEBTV®, or other Web browsing devices.

Each client node 20a through 20n is networked for communication with EDCS server 14. Typically, a client node is operatively coupled to communicate with EDCS server 14 via the Internet through a phone connection using a modem and telephone line (not shown), in a standard fashion. A client node may alternatively be coupled to EDCS server 14 via a network (e.g., LAN, WAN, etc.) connection. It will be apparent to those skilled in the art having the benefit of this disclosure that alternative means for networking clients 20a through 20n and server 14 may also be utilized, such as a direct point to point connection using modems, satellite connection, direct port to port connection utilizing infrared, serial, parallel, USB, FireWire/IEEE-1394, and other means known in the art. Generally, client nodes 20a through 20n and EDCS server 14 communicate using the TCP/IP (transfer control protocol/internet protocol). However, other protocols for communication may also be utilized, including PPTP, NetBEUI over TCP/IP, and other appropriate network protocols.

ECDS server 14 further comprises a database (DB) 21, which in the present exemplary embodiment is used for storage and retrieval of documents and/or files maintained by the EDCS server 14. DB 21 may be a conventional storage structure such as a table, or b-tree, integrated into the file system 18 of the EDCS server 14. While depicted as operating on a single server computer (server 14), DB 21 may also be implemented via one or more server computers (not shown), such as a server farm.

The system 10 further includes conventional anti-virus software (A-V) 22 operatively coupled for communication with the VDM 12. As described further below, the A-V 22 carries out the operation of checking files and/or documents communicated by the VDM 12 for virus infections upon request.

Referring next to FIG. 2, as well as FIG. 1, there is shown a functional block diagram of the VDM 12 operatively coupled for communication with the request handler 16 and the A-V 22. In general, the VDM 12 and the request handler 16 operating within the RAM of EDCS server 14, although typically in separate address spaces. The A-V 22 may be configured to run on the EDCS server 14 or some other network server (not shown) as is known in the art.

The VDM 12 comprises a check-in interceptor 30, a command-line A-V interface 32, and a DAT file updater and validater 34. The check-in interceptor 30 is operatively coupled for communication to the request handler 16 and intercepts user requests submitted to the request handler 16 from the client nodes 20a through 20n. Such requests may be to upload or update a document or file to the database 20. The check-in interceptor 30 intercepts the uploaded document or file before it is placed into the DB 21 by the file system 18. After interception, the check-in interceptor 30 passes the file to the command-line A-V interface 32 for further processing.

The command-line A-V interface 32 is operatively coupled for communication to the check-in interceptor 30 and to an A-V detector/cleaner 40 resident in the A-V 22. When an intercepted file is passed from the check-in interceptor 30, the command-line A-V interface 32 invokes the A-V 22 by providing the A-V detector/cleaner 40 with the intercepted file along with appropriate operating commands for detecting and cleaning the file. Typically, such commands are issued via command line switches, as is known in the art.

Within the A-V application 22, a virus data (DAT) file 42 is provided which contains the lists of virus strains suitable for use with the A-V 22. When the intercepted file is received from the command-line A-V interface 32 to the A-V detector/cleaner 40, the A-V detector/cleaner 40 attempts to detect the virus infection within the intercepted file, typically by scanning the intercepted file for known viruses as indicated by the DAT file 42. If a virus is detected, the A-V detector/cleaner 40 may further be configured to clean (i.e., remove the virus from) the intercepted file. Otherwise, the A-V detector/cleaner 40 simply flags the intercepted file as "infected". The A-V detector/cleaner 40 then replies to the command-line A-V interface 32 with one or more signal indicating whether a virus was found in the infected file and, if so, whether the virus was removed. If the virus was removed, the virus-free (or "clean") file is also returned to the command-line A-V interface 32 for further processing.

According to the invention, when a user of the client nodes 20a through 20n uploads a known infected file to the EDCS server 14, the user is notified. Accordingly, a notification is communication from the command line A-V interface 32 to the check-in interceptor 30 to the request handler 16, which then communicates such notification to the user.

According to another aspect of the invention, if the VDM 12 determines that an infected file (or document) was cleaned by the A-V software 22, it may permit the virus-free ("clean") file to be posted to the DB 21 by the file system 18. If, on the other hand, an infected file was only detected, but not cleaned (removed), the infected file is not allowed to post to the DB 21. Where the VDM 12 determines that an intercepted file did not contain a known virus (i.e., a virus was not detected by the A-V 22), then the intercepted document is allowed to post to the DB 21. Once a file or document is posted to the DB 21, other users of the client nodes 20a through 20n are able to query and download such file (or document). The present invention therefore provides means for intercepting known infected files for virus detection and removal (if necessary) before such files are made available to other users of the EDCS system 14.

The invention further provides means for updating and validating the DAT file 42 used by the A-V software 22. The DAT file updater and validater 34 is coupled for communication to the virus data (DAT) file 42 resident in the A-V 22. According to a scheduled interval (such as one a week), the DAT file updater and validater 34 periodically checks for updated DAT files, normally by contacting the manufacturer of the A-V software 22. For example, the DAT file updater and validater 34 may be scheduled to check the manufacturer's web site (via Internet connection 44) to determine whether a new DAT file has been posted for download. If so, the DAT file updater and validater 34 downloads the new (or updated) DAT file and then verifies the new DAT file. Verification is normally carried out by determining whether known viruses are detected by the new DAT file. If verification is successful, the DAT file updater and validater 34 replaces DAT file 42 with the new DAT file. The new DAT file is now used by the A-V detector/cleaner 40 for its operation.

The method and operation of invention will be more fully understood with reference to the logical flow diagrams of FIG. 3 and FIG. 4, as well as FIG. 1 and FIG. 2. FIG. 3 is a logical flow diagram depicting the acts associated with monitoring a document control system in accordance with the present invention. FIG. 4 is a logical flow diagram depicting the acts associated with updating the virus data file in accordance with the present invention. The order of actions as shown in FIG. 2 and FIG. 3 and described below is only exemplary, and should not be considered limiting.

At process 100 of FIG. 3, the VDM 12 is initiated. This process is normally started when the EDCS server 14 is initiated. Check-in interceptor 30 is also initiated as part of the VDM12. Box 110 is then carried out.

At box 110, the check-in interceptor 30 communicates with the request handler 16 to intercept user requests, submitted by users of the client nodes 20a through 20n to the EDCS server. In particular, the check-in interceptor 30 monitors for user requests to upload or update (i.e., "check-in") a document (or file) to the DB 22. Diamond 120 is then carried out.

At diamond 120, the check-in interceptor 30 determines if a document (or file) is submitted for "check in". If a document (or file) is submitted for check-in to the DB 21, box 130 is carried out. Otherwise, box 110 is repeated.

At box 130, the check-in interceptor 30 intercepts the document or file ("intercepted file") before the file is posted to the DB 21 by the file system 18. The intercepted file is then communicated to the command-line A-V interface 32 for processing with the A-V software 22. Box 140 is then carried out.

At box 140, the command-line A-V interface 32 invokes the A-V 22 software to detect and, if possible, clean the intercepted file. Diamond 150 is then carried out.

At diamond 150, the A-V 22 inspects the intercepted file to detect virus strains as provided by the DAT file 42. If one or more viruses are detected, box 160 is carried out. Otherwise, the box 190 is carried out.

At box 160, a signal is communicated to the user who submitted the infected file to inform the user that the uploaded file was infected with the virus detected in box 140. Box 170 is then carried out.

At box 170, the A-V 22 software removes the virus (if possible) to create a clean or "virus-free" file. As noted above, the A-V 22 may only be configured to detect and not remove viruses. Diamond 180 is then carried out.

At diamond 180, if the virus was removed from the intercepted file during box 170, box 190 is then carried out. Otherwise, the file is prevented from check-in into the DB 21 and Box 110 is repeated.

At box 190, intercepted file was either free of "known" viruses or was cleaned to remove the virus. The intercepted (clean) file is then checked-in to the DB 21. Once checked-in the DB 21, the file is available for use by other users accessing the EDCS server 14. Box 110 is then repeated.

Referring now to FIG. 4, as well as FIG. 1 through FIG. 3, there is shown a logical flow diagram depicting the acts associated with updating the virus data (DAT 42) file in accordance with the present invention.

At process 200, the VDM 12 is initiated. As noted in box 100 of FIG. 3 above, this process is normally started when the EDCS server 14 is initiated. DAT file updater and validater 34 is initiated as part of the VDM 12. Box 210 is then carried out.

At box 210, the DAT file updater and validater 34 determines whether the scheduled time for checking for new or updated DAT files has occurred. As described above, the DAT file updater and validater 34 can be configured to run at periodic intervals, such as once per week. If the scheduled time has occurred, box 220 is carried out. Otherwise, diamond 210 is repeated.

At box 220, the DAT file updater and validater 34 connects to the manufacturer of the A-V 22 to obtain the latest DAT file. Normally, this process is carried out by connecting to the manufacturer's web site (via the internet 44) and downloading the latest DAT file via http commands. After download the DAT file may need to be "unpacked" or uncompressed for use. Box 230 is then carried out.

At box 230, the DAT file updater and validater 34 tests the downloaded ("new") DAT file. This test is normally carried out by checking known files (or documents) having viruses with information provided by the new DAT file. Other validation tests may also be carried out. Diamond 240 is then carried out.

At diamond 240, the DAT file updater and validater 34 determines whether the "new" DAT file was validated according to the tests carried out during box 230. If the new DAT file was validated, box 250 is carried out. Otherwise box 220 is repeated to obtain an valid DAT file.

At box 250, the DAT file updater and validater 34 updates DAT file 42 in the A-V 22 with the new DAT file. The new DAT file is now used by the A-V detector/cleaner 40 for its operation. Diamond 210 is then carried for the next schedule update.

Accordingly, it will be seen that this invention provides a virus detection monitoring system suitable for use with network servers which intercepts incoming files and documents during check-in for virus detection and possible removal before such files and documents are made available to other users of of the network sever. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. In a networked server having a file system therein, a virus detection monitoring system comprising:

a) a check-in interceptor configured to monitor the network server for incoming files and intercept incoming files before said files are transferred to the file system of the server; and b) an anti-virus interface operatively coupled to said check-in interceptor, said anti-virus interface configured to transfer the incoming files which are intercepted to an anti-virus application for virus detection and removal, wherein said check-in interceptor is further configured to prevent an intercepted incoming file from entering the file system if a virus is detected in the intercepted incoming file and the virus is not removed by the anti-virus application.

2. The virus detection monitoring system of claim 1 wherein said anti-virus interface is further configured to receive from said anti-virus application a signal indicating whether a virus was detected in the intercepted incoming file and whether the virus was removed.

3. The virus detection monitoring system of claim 1 wherein said anti-virus interface is further configured to receive from said anti-virus application a signal indicating whether a virus was detected in the intercepted incoming file, said check-in interceptor further configured to communicate the signal to a user submitting the intercepted incoming file.

4. The virus detection monitoring system of claim 1, further comprising a "dat file updater and validater" coupled to the anti-virus application, said dat file updater and validater configured to periodically download updated virus data, validate the updated virus data after download, and update said anti-virus application with said updated virus data after validating said virus data.

5. The virus detection monitoring system of claim 1, wherein said check-in interceptor inspects documents and files uploaded to an electronic document control system operating on the network server.

6. The virus detection monitoring system of claim 1, wherein said check-in interceptor intercepts document upload commands issued to the network server.

7. The virus detection monitoring system of claim 6, wherein said document upload commands comprise hypertext transfer protocol commands.

8. In a networked server having a file system therein, a method for virus detection monitoring comprising:

a) intercepting incoming files before the incoming files are transferred to the file system of the server;

b) transferring the incoming files which are intercepted to an anti-virus application for virus detection and removal; and c) preventing an intercepted file from entering the file system if a virus is detected in the incoming file and the virus is not removed by the anti-virus application.

9. The method of claim 8, further comprising:

a) receiving a signal from said anti-virus application, said signal indicating whether a virus was detected in the intercepted incoming file; and b) communicating the signal to a user submitting the intercepted incoming file.

10. The method of claim 8, further comprising:

a) periodically downloading updated virus data;

b) validating the updated virus data; and c) updating said anti-virus application with said updated virus data.

11. The method of claim 8, wherein said network server comprises an electronic document control system.

12. A program storage device readable by a machine, tangibly embodying a program of instructions executable by the machine to perform a method for virus detection monitoring, said method comprising:
- a) intercepting incoming files before the files are transferred to a file system of a server;
- b) transferring the incoming files which are intercepted to an anti-virus application for virus detection and removal; and
- c) preventing the intercepted incoming file from entering the file system if a virus is detected in the intercepted incoming file and the virus was not removed by the anti-virus application.

13. The program storage device of claim 12, said method further comprising:
- a) receiving a signal from said anti-virus application, said signal indicating whether a virus was detected in the intercepted incoming file; and
- b) communicating the signal to a user submitting the intercepted incoming file.

14. The program storage device of claim 12, said method further comprising:
- a) periodically downloading updated virus data;
- b) validating the updated virus data; and
- c) updating said anti-virus application with said updated virus data.

15. The program storage device of claim 12, wherein said network server comprises an electronic document control system.

16. In a networked server having a file system therein, a virus detection monitoring system comprising:
- a) means for intercepting incoming files before the incoming files are transferred to the file system of the server;
- b) means for transferring the incoming files which are intercepted to an anti-virus application for virus detection and removal; and
- c) means for preventing an intercepted incoming file from entering the file system if a virus was detected in the intercepted incoming file and the virus is not removed by the anti-virus application.

17. The virus detection monitoring system of claim 16, further comprising:
- a) means for receiving a signal from said anti-virus application, said signal indicating whether a virus was detected in the intercepted incoming file; and
- b) means for communicating the signal to a user submitting the intercepted incoming file.

18. The virus detection monitoring system of claim 16, further comprising:
- a) means for downloading updated virus data according to a schedule;
- b) means for validating the updated virus data; and
- c) means for updating said anti-virus application with said updated virus data.

19. The virus detection monitoring system of claim 16, wherein said network server comprises an electronic document control system.

\* \* \* \* \*